United States Patent
Gruetzmacher et al.

(10) Patent No.: US 6,433,125 B1
(45) Date of Patent: Aug. 13, 2002

(54) FATTY CHEMICAL POLYALCOHOLS AS REAGENT THINNERS

(75) Inventors: Roland Gruetzmacher, Wuelfrath; Ulrich Nagorny, Hilden; Wolfgang Gress, Wuppertal; Rainer Hoefer; Andreas Heidbreder, both of Duesseldorf; Birgit Hirschberger, Moenchengladbach, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 815 days.

(21) Appl. No.: 09/029,637
(22) PCT Filed: Aug. 31, 1996
(86) PCT No.: PCT/EP96/03834
   § 371 (c)(1),
   (2), (4) Date: Mar. 6, 1998
(87) PCT Pub. No.: WO97/09363
   PCT Pub. Date: Mar. 13, 1997

(30) Foreign Application Priority Data

Sep. 8, 1995 (DE) .......................................... 195 33 168

(51) Int. Cl.$^7$ .............................................. C08G 18/36
(52) U.S. Cl. ........................................ 528/73; 528/74.5
(58) Field of Search .................................... 528/73, 74.5

(56) References Cited

U.S. PATENT DOCUMENTS

| 4,535,142 A | 8/1985 | Brauer et al. .................. 528/75 |
| 4,886,893 A | 12/1989 | Meffert et al. ............... 549/562 |

FOREIGN PATENT DOCUMENTS

| CA | 850 672 | 9/1970 |
| DE | 16 45 573 | 1/1971 |
| DE | 32 46 612 | 6/1984 |
| EP | 0 260 499 | 3/1988 |
| GB | 1 100 404 | 1/1968 |
| GB | 1 139 137 | 1/1969 |
| WO | WO94/21702 | 9/1994 |

OTHER PUBLICATIONS

DIN 53157 (Jan. 1987).

*Primary Examiner*—Rachel Gorr
(74) *Attorney, Agent, or Firm*—John E. Drach; Steven J. Trzaska

(57) ABSTRACT

A process for producing coating compositions involving: (a) providing a reactive diluent, (b) providing an inert solvent, (c) providing a polymeric polyol, (d) providing an isocyanate, (e) reacting (a)–(d) in a reactive diluent comprising a ring opening product of a carboxylic acid ester epoxide with a dihycric or higher alcohol.

24 Claims, No Drawings

FATTY CHEMICAL POLYALCOHOLS AS REAGENT THINNERS

FIELD OF THE INVENTION

This invention relates to the use of oleochemical polyols as reactive diluents in coating compositions. The use of such dilution systems results in a saving of up to 60% of solvent in high-solids polyurethane systems.

BACKGROUND OF THE INVENTION

Polyurethanes may be used in various forms including, for example, elastomers, foams, casting resins, composite materials, paints and other coatings. Polyurethane-based products such as these are normally produced by reacting aliphatic, aromatic and even heterocyclic isocyanates with high molecular weight polymers containing hydroxy groups. The properties of the resulting polyurethanes are largely determined by the nature and mixing ratio of the basic monomers and by any additives present. One of the most important applications of polyurethanes is in the field of coating compositions. Polyurethane films exhibit, for example, good substrate adhesion, gloss, electrically insulating properties, low gas permeability, resistance to water and solvents and high resistance to weathering. In addition, they can be produced with different degrees of flexibility and under various temperature conditions.

In general, any polyhydroxy compound may be used together with a component containing at least two isocyanate groups for the production of polyurethanes. Hydroxyl-terminated polyesters with or without additional hydroxy groups on the polymer chain, hydroxyl-terminated polyethers, copolymers of hydroxyl-functionalized acrylates and/or methacrylates with acrylate and/or methacrylate esters, styrene, copolymers of allyl alcohol and other unsaturated monomers and also alkyd resins are preferably used as the polymeric polyols. Unfortunately, hydroxy-functional polymers such as these are highly viscous resins and require solvents, in some cases considerable quantities of solvents, to obtain a viscosity suitable for application through spray nozzles.

One way of reducing the viscosity of coating compositions containing high molecular weight resins is to mix the polymeric polyols with low molecular weight, hydroxyl-terminated low-viscosity polyethers. However, the disadvantage of this is that the polyurethanes formed exhibit low hydrolysis stability, high sensitivity to solvents and poor weathering behavior. Another way of reducing the viscosity of a coating composition is to use low molecular weight isocyanates as reactants for the polymeric polyols. Unfortunately, the volatility and toxicity of these compounds can lead to serious environmental problems and to health problems for people involved in their processing. The stringent safety precautions involved make this method of reducing viscosity uneconomical.

Accordingly, most commercially obtainable isocyanates are reaction products of low molecular weight polyols with polyisocyanate compounds in which the volatility of the isocyanate component is reduced by the high molecular weight of the reaction products with the polyols. A disadvantage of the relatively high molecular weight isocyanates described herein is that, in admixture with the polymeric polyols, their viscosity is only slightly reduced so that they are not easy to apply, for example through spray nozzles. As a result, solvent again has to be added in a considerable quantity to reduce the viscosity of the coating composition to a level suitable for application.

One method of using reactive solvents is to mix low molecular weight diols, for example ethylene glycol, propylene glycol, glycerol and trimethylol propane (TMP) or liquid oligomers thereof, with the coating composition. Unfortunately, the use of low molecular weight reactive solvents as chain extenders for the isocyanate component often leads to fragile, hydrolysis-sensitive polyurethane films which are generally unable to satisfy the performance requirements for modern materials. Problems can also be caused by the incompatibility of most polyisocyanate components with the low molecular weight polyols which often leads to phase separation and hence to inadequacies in the material produced.

To reduce the amount of solvent in polyurethane-based coating compositions, it is possible for example to use low-viscosity hydrophobic polyols which, on curing of the coating composition, become part of the coating and thus reduce solvent emission.

CA 850,672 describes the use of oleochemical polyols for reducing viscosity in polyurethane-based coating compositions. In this case, the partial incompatibility of the oleochemical polyols with the OH-functionalized polymers is overcome by heating the components at 250° C. The possibility of mixing the coating composition with inert solvents to reduce solvent consumption and to improve the compatibility of the reactants is not mentioned.

U.S. Pat. No. 4,535,142 describes the use of ester-linked diricinoleate derivatives as reactive diluents in high-solids coatings. One of the disadvantages involved in such an application is, for example, the dependence on a single raw material. Another disadvantage is that, because ricinoleic acid is used, the number of OH groups can only be varied at considerable cost, if at all.

The problem addressed by the present invention was to provide a reactive diluent which would enable the consumption of conventional solvents inert to isocyanate groups to be reduced, in general distinctly reduced. Another problem addressed by the invention was to enable the reactive diluent to be used together with other solvents in such a way that the components would be compatible with no need for an additional thermal homogenization step and all the required components would be homogeneously miscible. Another problem addressed by the invention was to provide a polyurethane-based coating composition and a process for its production.

It has now surprisingly been found that up to 60% by weight of solvent can be saved by using ring opening products of carboxylic acid ester epoxides with dihydric or higher alcohols as reactive diluents in such coating compositions.

DESCRIPTION OF THE INVENTION

The present invention relates to the use of ring opening products of carboxylic acid ester epoxides with dihydric or higher alcohols in admixture with polymeric polyols, isocyanates, inert solvents and, optionally, typical additives as reactive diluents for the production of coating compositions.

Starting materials for the reactive diluents according to the invention are carboxylic acid esters, carboxylic acid esters of aliphatic or cycloaliphatic carboxylic acids containing 6 to 44 carbon atoms being preferred. Since the carboxylic acid esters are intended to be subjected to epoxidation in a following step, one or more C—C double bonds are advantageously already present in the carboxylic acid. However, it is also possible in accordance with the invention to use carboxylic acids of which the C—C double bond first has to be produced synthetically by a chemical transformation such as, for example, elimination or synthesis of a C—C double bond.

Preferred carboxylic acid ester epoxides are those which can be produced from fatty acids and/or fatty acid esters, more particularly from fatty acids and/or fatty acid esters or derivatives of fatty acids and/or fatty acid esters of natural origin.

These include, for example, the triglycerides beef tallow, palm oil, peanut oil, castor oil, rapeseed oil, cottonseed oil, soybean oil, train oil, sesame oil, sunflower oil, corn oil, poppyseed oil, perilla oil, cereal seed oil and linseed oil and also tall oil fatty acids and esters thereof.

The fatty acid esters may be obtained both by direct esterification of the fatty acid with the desired alcohol and by transesterification of fatty acid esters of monohydric or polyhydric alcohols.

Aliphatic alcohols are generally used for the transesterification, the alcohols normally having a functionality of 1 to 10. Alcohols with a functionality of 1 to 5 are preferably used, alcohols with a functionality of 1 to 2 being particularly preferred for the purposes of the invention. It does not matter whether the alcohol used for the transesterification is linear, branched, saturated or unsaturated. However, saturated alcohols containing 1 to 24 carbon atoms are preferably used for the transesterification.

These include, for example, methanol, ethanol, propanol, isobutanol, n-butanol, hexanol, heptanol, octanol, nonanol, decanol, 2-ethylhexanol, ethylene glycol, propylene glycol and butylene glycol.

Of these alcohols, those containing 1 to 10 carbon atoms are preferred while those containing 1 to 3 carbon atoms are most particularly preferred. According to the invention, the use of methanol is particularly preferred. The unsaturated ester is reacted to form the epoxide in known manner, for example by reaction with formic acid/$H_2O_2$ However, any other process which leads to an epoxide of an unsaturated fatty acid ester may also be used.

The epoxidation reaction is preferably carried out quantitatively, i.e. until all the olefinic C—C double bonds present have been reacted, in general completely reacted.

Aliphatic alcohols containing 2 to 44 carbon atoms and preferably 2 to 6 carbon atoms and having a functionality of 1 to 6, preferably 2 to 4 and, more preferably, 2 or 3 are used for opening the oxirane ring. Examples of such alcohols are ethylene glycol, propylene glycol, butylene glycol, glycerol and trimethylol propane (TMP) and alkoxylation products thereof with ethylene oxide (EO), propylene oxide (PO) and EO/PO mixtures. The ring opening reaction takes place under the conditions described, for example, in DE-A-32 46 612. Suitable acidic catalysts are typical mineral acids or lower organic carboxylic acids such as, for example, sulfuric acid, phosphoric acid, formic acid, trifluoromethane sulfonic acid or acetic acid. The acidic catalysts may be used in concentrations of 0.1% by weight, based on the starting materials.

The ring opening reaction may be carried out at temperatures of 80 to 120° C. and preferably at temperatures of 90 to 100° C. The catalyst acid is then advantageously neutralized with a base, for example with sodium hydroxide, sodium methylate or tertiary amines.

The ratio of OH groups to oxirane rings is generally between 5:1 and 1:5 and preferably between 2:1 and 1:2, a ratio of 1.4:1 to 1:1.4 being particularly preferred for the purposes of the invention. Carboxylic acid ester epoxides containing a $C_{8-24}$ fatty acid residue are preferably ring-opened, the use of carboxylic acid ester epoxides containing 14 to 18 carbon atoms generally being preferred for the purposes of the invention.

The reactive diluents thus obtainable generally have an OH value of 30 to 800, OH values of 120 to 550 being preferred. The epoxide value should not exceed 9.5 and is generally between 0 and 5.5, epoxide values of 0 to 2.5 being particularly preferred. Normally, the polyols thus obtained are largely water-free, a water content of less than 0.5% by weight being preferred and a water content of less than 0.1% by weight being particularly preferred for the purposes of the invention.

The reactive diluents generally have an OH equivalent weight of less than 320, their molecular weight generally not exceeding 5,000 and preferably not exceeding 3,000.

In the context of the invention, the equivalent weight is understood to be the molecular weight divided by the number of OH groups.

Besides the reactive diluents, the coating composition contains polymeric polyols as resins. In the context of the present invention, a resin is normally understood to be a material which—generally together with a corresponding hardener—represents a binder which forms a macromolecular network with the requisite material properties, preferably by chemical reaction.

Polyester polyols, alkyd resins, hydroxyl-containing polyacrylates and/or polymethacrylates may generally be used as polymeric polyols for the purposes of the invention. It is also possible to use polymers and/or copolymers obtained by polymerization, polyaddition or polycondensation of hydroxyl-containing monomers or (co)polymers from which hydroxy groups can be released in a subsequent polymer-analog reaction. Products of the addition of one or more moles of ethylene oxide, propylene oxide and/or higher alkylene oxides to at least dihydric alcohols are also polymeric polyols in the context of the present invention.

According to the invention, polyester polyols and polyether polyols or mixtures thereof, alkyd resins, hydroxy-functional polyacrylates and polymethacrylates are used as polymeric polyols.

It is particularly preferred to use polyester polyols obtained by condensation of difunctional aliphatic and/or aromatic acids with polyhydric aliphatic alcohols, more particularly from the condensation of phthalic acid and TMP. Among the hydroxyfunctional poly(meth)acrylates, those with an average to high degree of crosslinking are preferred for the purposes of the invention.

The polymeric polyols generally have an equivalent weight of more than 320, their molecular weight preferably being higher than 1,500 and, more preferably, higher than 3,000. The polymeric polyols may be present in solid or liquid form. So far as the invention is concerned, it does not matter whether the polymer has first to be converted into the liquid aggregate state by addition of solvent or by heating or whether it is inherently liquid.

In addition, other solvents than the polyols obtained by ring opening of carboxylic acid ester epoxides may be used in the coating compositions according to the invention. Any incompatibility between resin, hardener and reactive diluent and additives, if any, can lead to phase separation, clouding and, hence, inferior material properties. Besides reducing viscosity, the addition of other solvents can overcome any incompatibility between the individual components of the coating composition. The percentage content of these "inert" solvents will be determined by the desired viscosity and by the desired homogeneity of the coating composition. Their contribution to the overall diluent content (consisting of reactive diluent and other solvents) may amount to between 1 and 99% by weight, but is preferably between 1 and 80% by weight and more preferably between 1 and 60% by weight. According to the invention, solvents which are substantially or completely inert to isocyanate groups are preferably used. They are generally added irrespective of the presence of other solvents in one of the components of the coating composition. The solvent is preferably used in a quantity of at least 1% by weight, based on the total solvent and reactive diluent content.

In a particularly preferred embodiment, solvents completely inert to isocyanate groups are selected from the group consisting of xylenes, toluene and higher alkyl benzenes, such as ethyl benzene and propyl benzene, esters such as, for example, methoxypropyl acetate, ethoxypropyl acetate and 2-methoxy-1-methyl acetate and low molecular weight ketones.

The coating composition according to the invention additionally contains polyisocyanates as hardeners. As wellknown to the expert, isocyanates react with free hydroxy groups in an addition reaction to form a urethane group. Any of the usual polyfunctional aromatic and aliphatic isocyanates including, for example, any oligomeric and polymeric isocyanate compounds of the type obtainable by oligomerization or cyclization of polyisocyanates in the absence of moisture or by reaction of polyhydric alcohols with polyisocyanates may generally be used as the isocyanate components according to the invention. The polyisocyanates may be used in more than and less than the equivalent quantities. Examples include HDI trimer (tris-(6-isocyanatohexyl)-isocyanurate) (Tolonate® HDT, Rhone-Poulenc), 4,4-diphenyl methane diisocyanate (MDI) (Desmodur® VL, Bayer AG), HDI biuret (1,3,5-tris-(6-isocyanatohexyl)-biuret), hexamethylene diisocyanate biuret (Desmoduro® N 75, Bayer AG) and an aromatic polyisocyanate based on toluylene diisocyanate (Desmodur® L 67, Bayer AG). The hardener is added in such a quantity that the OH:NCO equivalence ratio is between 1:0.1 and 1:1.5, preferably between 1:0.75 and 1:1.25 and more preferably between 1:0.9 and 1:1.1.

The isocyanates may be used both in pure form and in the form of technical mixtures with or without solvent.

Other components of the coating compositions are—optionally—additives such as, for example, dyes, pigments, fillers, rheological additives, antioxidants, bactericides, fungicides, corrosion inhibitors, catalysts and UV stabilizers.

The present invention also relates to a process for the production of polyurethane-based coating compositions in which ring opening products of carboxylic acid ester epoxides with dihydric or higher alcohols as reactive diluents, inert solvents, polymeric polyols and optionally typical additives are mixed with isocyanates.

More particularly, the invention relates to a process for the production of polyurethane-based coating compositions in which ring opening products of carboxylic acid ester epoxides with dihydric or higher alcohols as reactive diluents are mixed with inert solvents, polymeric polyols and optionally typical additives.

The invention also relates to coating compositions containing ring opening products of carboxylic acid ester epoxides with dihydric or higher alcohols as reactive diluents, inert solvents, polymeric polyols, isocyanates and optionally typical additives.

According to the invention, coating compositions which contain the reactive diluent in a quantity of 1 to 99% by weight, based on the total diluent content, and the inert solvents in a quantity of 1 to 99% by weight and preferably 1 to 50% by weight, based on the total diluent content, are generally preferred.

EXAMPLES

Various oleochemical polyols were tested for their suitability as reactive diluents in clear lacquers and finishing lacquers. The trade name is followed in brackets by the abbreviations used in the Examples.

The following Henkel products were used as the oleochemical polyols:

Sovermol® 750 (750), Sovermol® 815 (815) and Sovermol® 1102/I (1102)

These oleochemical polyols are branched polyesters/polyethers based on oleochemicals.

The following Bayer products were used as the polyester polyols:

| | |
|---|---|
| Desmophen ® 650 (650) | branched hydroxyl-containing polyester |
| Desmophen ® 651 (651) | branched hydroxyl-containing polyester |
| Desmophen ® 670 (670) | lightly branched hydroxl-containing polyester |
| Alkydal ® R 35 (R 35) | alkyd resin containing 38% ricinene oil |

The following products of Henkel Corp. were used as the hydroxyl-containing polyacrylates:

| | |
|---|---|
| G-Cure ® 105 (105) | hydroxyl-containing polyacrylate with a low to average crosslink density |
| G-Cure ® 106 (106) | hydroxyl-containing polyacrylate with an average crosslink density |
| G-Cure ® 109 (109) | hydroxyl-containing polyacrylate with a high crosslink density |

The following isocyanates were used for crosslinking:

| | |
|---|---|
| Desmodur ® L 67 (L 67) | aromatic polyisocyanate based on toluylene diisocyanate |
| Desmodur ® N 75 (N 75) | hexamethylene-1,6-diisocyanatobiruet |
| Desmodur ® VL (VL) | 4,4'-diphenyl methane diisocyanate |
| Tolonate ® HDT (HDT) | tris-(6-isocyanatohexyl)-isocyanurate (trimer) |
| Tolonate ® HDT-LV (HDT-LV) | low-viscosity preparation of tris-(6-isocyanatohexyl)-isocyanurate (trimer) |

The weathering tests were carried out in a QUV accelerated weathering tester, ASTM G 53-77, for artificial weathering. The exposure to ultraviolet light was carried out at 350 nm. The test conditions were 4 hours' light at 60° C. and 4 hours' condensation at 50° C.

The viscosities were measured with a Brookfield viscosimeter, spindle 4, at 25° C./30 r.p.m.

The pendulum hardness values were measured in accordance with DIN 53157.

Clear Lacquers I

Table 1 below illustrates the effectiveness of the polyols according to the invention when used with polyester polyols in clear lacquers. The particular polyester polyol is shown in the column headed "Polyol". The column headed "Isocyanate" is self-explanatory. The viscosity of the mixture of the corresponding polyol with the corresponding isocyanate is shown in the column headed "Initial visc.". The quantity of xylene/methoxypropyl acetate (3:1) in % by weight, based on the coating composition as a whole, which is required to achieve a viscosity of 1,000 mPas in the coating composition is shown in the column headed "Solv. for 1,000 mpas". Then come three headings "Polyol 750", "Polyol 815" and "Polyol 1102" each covering three columns. The "+20%" column shows the viscosity of the coating composition after an addition of 20% by weight (based on the coating composition as a whole) of the particular oleochemical polyol. The "% Solv." column shows the quantity of xylene/methoxypropyl acetate (3:1) which is required to achieve a viscosity of 1,000 mPas after addition of the reactive diluent while the "Δ" column shows the difference in quantity (in parts by weight) for the addition of xylene/methoxypropyl acetate (3:1) for achieving a viscosity of 1,000 mPas without and with oleochemical polyol as reactive diluent.

It can clearly be seen that, in virtually every case, the use of 20% by weight of the ring-opened oleochemical polyols in accordance with the invention leads to a distinct reduction in the consumption of solvent required to reach an exemplary application viscosity of 1,000 mPas. The application viscosity of 1,000 mPas selected in the Examples is not intended to limit the invention in any way and, if desired, may be corrected both upwards and downwards in known manner by varying the components.

Clear Lacquers II

Table 2 illustrates the effectiveness of the polyols according to the invention when used with hydroxyl-containing polyacrylates in clear lacquers. The particular polyacrylate is shown in the column headed "Polyol". The other column headings have the same meanings as in Table 1.

Table 3 compares the pendulum hardnesses (as measured in accordance with DIN 53157) of the clear lacquers according to the invention with the pendulum hardnesses of conventionally produced coating compositions.

Finishing Lacquers I

Table 4 compares the strengths of the finishing lacquers according to the invention with those of conventional coating compositions. Polyester polyols were used as the polymeric polyol. The combinations polyol/reactive diluent and isocyanate are shown in the uppermost line. The following lines represent the behavior of finishing lacquers according to the invention and comparison finishing lacquers in a QUV accelerated weathering tester. Resistance to methyl ethyl ketone is shown in the last line.

The test results show that the use of the reactive diluents in accordance with the invention in various amounts with polyester polyols produces improved results, in some cases distinctly improved results, in regard to the hardness and gloss of the products obtained. Weathering in the QUV accelerated weathering tester shows that the weathering resistance of coatings produced using reactive diluents are almost identical with the values of comparison coatings.

Table 5 shows the results of tests identical with Table 4 using hydroxyl-containing polyacrylates as the polymeric polyols.

TABLE 1

Saving of Solvent in Clear Lacquers (Polyurethane) Containing Reactive Diluent

| Polyol | Isocyanate | Initial visc. | % Solv. for 1000 mPas | Reactive diluent 750 | | |
|---|---|---|---|---|---|---|
| | | | | +20% | % Solv. | Δ |
| 650 | N 75 | 2400 | 8.8 | 2000 | 4.8 | −4.0 |
| | L 67 | 6100 | 13.3 | 5100 | 9.6 | −3.7 |
| 651 | N 75 | 2300 | 3.9 | 1500 | 2.0 | −1.9 |
| | L 67 | 7600 | 13.9 | 4100 | 7.4 | −6.5 |
| 670 | N 75 | 1000 | — | 950 | — | 0 |
| | L 67 | 2200 | 8.0 | 1900 | 4.6 | −3.4 |
| | VL | 1850 | 2.2 | 1800 | 6.1 | +3.9 |
| | HDT | 3000 | 9.6 | 2300 | 9.6 | 0 |
| | HDT-LV | 2400 | 7.1 | 1600 | 5.9 | −1.2 |
| R 35 | N 75 | 980 | — | 600 | — | — |
| | L 67 | 1710 | 5.5 | 1200 | — | −5.5 |
| | VL | 1040 | — | 700 | — | — |
| | HDT | 1610 | 8.1 | 1100 | — | −8.1 |
| | HDT-LV | 1130 | — | 750 | — | — |

| | | Reactive diluent 815 | | | Reactive diluent 1102 | | |
|---|---|---|---|---|---|---|---|
| Polyol | Isocyanate | +20% | % Solv. | Δ | +20% | % Solv. | Δ |
| 650 | N 75 | 2300 | 4.7 | −4.1 | 2200 | 4.2 | −4.6 |
| | L 67 | 5200 | 11.5 | −1.8 | 4250 | 11.6 | −1.7 |
| 651 | N 75 | — | — | — | 1600 | 7.0 | −1.9 |
| | L 67 | — | — | — | 4300 | 8.6 | −5.3 |
| 670 | N 75 | 950 | — | 0 | 850 | — | 0 |
| | L 67 | 1900 | 4.5 | −3.5 | 1600 | 4.3 | −3.7 |
| | VL | 1800 | 6.3 | +4.1 | 1500 | 6.3 | +4.1 |
| | HDT | 2300 | 9.9 | −0.3 | 2000 | 9.9 | +0.3 |
| | HDT-LV | 1600 | 5.7 | −1.4 | 1500 | 5.8 | −1.3 |
| R 35 | N 75 | 700 | — | 0 | 550 | — | — |

TABLE 1-continued

Saving of Solvent in Clear Lacquers (Polyurethane) Containing Reactive Diluent

| | | | | | | |
|---|---|---|---|---|---|---|
| L 67 | 1540 | — | −5.5 | 1100 | — | −5.5 |
| VL | 900 | — | 0 | 650 | — | — |
| HDT | 1500 | — | −8.1 | 950 | — | −8.1 |
| HDT-LV | 950 | — | — | 800 | — | — |

TABLE 2

Saving of Solvent in Clear Lacquers (Acrylates) Containing Reactive Diluent

| | | Initial | % Solv. for | Reactive diluent 750 | | |
|---|---|---|---|---|---|---|
| Polyol | Isocyanate | visc. | 1000 mPas | +20% | % Solv. | Δ |
| G 105 | N 75 | 4500 | 10.1 | 1900 | 3.8 | −6.3 |
| | L 67 | 10250 | 17.1 | 4300 | 10.6 | −6.5 |
| | VL | 10800 | 13.8 | 5350 | 12.5 | −1.3 |
| | HDT | 17000 | 18.7 | 7800 | 16.9 | −1.8 |
| | HDT-LV | 13600 | 16.9 | 4750 | 16.6 | −0.3 |
| G 106 | N 75 | 1500 | 2.0 | 1000 | — | −2.0 |
| | L 67 | 3350 | 8.2 | 2600 | 5.1 | −3.1 |
| | VL | 3500 | 7.4 | 2300 | 6.0 | −1.4 |
| | HDT | 5900 | 13.0 | 4000 | 8.9 | −4.1 |
| | HDT-LV | 3750 | 6.8 | 2800 | 5.3 | −1.5 |
| G 109 | N 75 | 1900 | 4.0 | 1200 | — | −4.0 |
| | L 67 | 7600 | 10.4 | 3650 | 7.9 | −2.5 |
| | VL | 6000 | 11.4 | 3700 | 8.9 | −2.5 |
| | HDT | 10100 | 14.8 | 5950 | 11.5 | −3.3 |
| | HDT-LV | 6700 | 11.7 | 3750 | 7.9 | −3.8 |

| | | Reactive diluent 815 | | | Reactive diluent 1102 | | |
|---|---|---|---|---|---|---|---|
| Polyol | Isocyanate | +20% | % Solv. | Δ | +20% | % Solv. | Δ |
| G 105 | N 75 | 2400 | 5.9 | −4.2 | 1900 | 4.0 | −6.1 |
| | L 67 | 5350 | 12.3 | −4.8 | 4250 | 10.8 | −6.3 |
| | VL | 6100 | 13.1 | −0.7 | 5300 | 12.2 | −1.6 |
| | HDT | 8850 | 17.6 | −1.1 | 7500 | 15.8 | −2.9 |
| | HDT-LV | 6150 | 16.5 | −0.4 | 4600 | 15.2 | −1.7 |
| G 106 | N 75 | 1100 | — | −2.0 | 900 | — | −2.0 |
| | L 67 | 3000 | 7.4 | −0.8 | 2400 | 5.0 | −3.2 |
| | VL | 2700 | 6.0 | −1.4 | 2100 | 5.9 | −1.5 |
| | HDT | 4100 | 10.2 | −2.8 | 3800 | 8.3 | −4.7 |
| | HDT-LV | 3100 | 6.3 | −0.5 | 2650 | 5.0 | −1.8 |
| G 109 | N 75 | 1300 | 1.0 | −3.0 | 1000 | — | −4.0 |
| | L 67 | 3850 | 7.7 | −2.7 | 3400 | 6.0 | −4.4 |
| | VL | 3950 | 10.1 | −1.3 | 3500 | 7.2 | −4.2 |
| | HDT | 6100 | 12.4 | −2.4 | 5750 | 10.2 | −4.6 |
| | HDT-LV | 3900 | 8.2 | −3.5 | 3600 | 6.5 | −5.2 |

TABLE 3

Comparison of the Pendulum Hardness Values (DIN 53157) of Clear Lacquers Containing Reactive Diluent

| | | With no addition | | With 20% 750 | |
|---|---|---|---|---|---|
| Polyol | Isocyanate | Beginning | End | Beginning | End |
| D 650 | N 75 | 14 | 207 | <14 | 213 |
| | L 67 | 83 | 179 | 130 | 190 |
| D 651 | N 75 | 80 | 216 | 17 | 207 |
| | L 67 | 157 | 178 | 161 | 186 |
| D 670 | N 75 | <14 | <14 | <14 | 25 |
| | L 67 | 38 | 55 | 32 | 104 |
| | VL | 14 | 22 | 15 | 32 |
| | HDT | <14 | <14 | <14 | 29 |
| | HDT-LV | <14 | <14 | <14 | 17 |
| Alkydal R 35 | N 75 | 46 | 199 | 20 | 92 |
| | L 67 | 119 | 185 | 129 | 169 |
| | VL | 100 | 130 | 115 | 150 |
| | HDT | 52 | 146 | 21 | 92 |
| | HDT-LV | 39 | 133 | 17 | 64 |
| G-Cure 105 | N 75 | 21 | 203 | <14 | 136 |
| | L 67 | 104 | 158 | 101 | 154 |
| | VL | 143 | 157 | 123 | 147 |
| | HDT | 22 | 200 | <14 | 171 |
| | HDT-LV | <14 | 193 | <14 | 169 |
| G-Cure 106 | N 75 | 17 | 181 | <14 | 157 |
| | L 67 | 130 | 164 | 120 | 165 |
| | VL | 158 | 162 | 146 | 146 |
| | HDT | 31 | 193 | <14 | 179 |
| | HDT-LV | 22 | 189 | <14 | 179 |
| G-Cure 109 | N 75 | <14 | 200 | <14 | 188 |
| | L 67 | 101 | 174 | 102 | 165 |
| | VL | 48 | 168 | 139 | 158 |
| | HDT | <4 | 195 | <14 | 174 |
| | HDT-LV | <14 | 196 | <14 | 171 |

| | | With 20% 815 | | With 20% 1102 | |
|---|---|---|---|---|---|
| Polyol | Isocyanate | Beginning | End | Beginning | End |
| D 650 | N 75 | <14 | 219 | <14 | 217 |
| | L 67 | 119 | 190 | 98 | 182 |
| D 651 | N 75 | — | — | 15 | 175 |
| | L 67 | — | — | 158 | 183 |
| D 670 | N 75 | <14 | 24 | <14 | 20 |
| | L 67 | 21 | 52 | 25 | 84 |
| | VL | <14 | 34 | <14 | 120 |
| | HDT | <14 | 15 | <14 | 15 |
| | HDT-LV | <14 | <14 | <14 | <14 |
| Alkydal R 35 | N 75 | 22 | 76 | <14 | 64 |
| | L 67 | 99 | 160 | 108 | 169 |
| | VL | 80 | 110 | 126 | 137 |
| | HDT | 22 | 84 | 14 | 64 |
| | HDT-LV | 21 | 78 | <14 | 57 |
| G-Cure 105 | N 75 | <14 | 150 | <14 | 111 |
| | L 67 | 99 | 155 | 78 | 143 |
| | VL | 132 | 148 | 126 | 143 |
| | HDT | <14 | 169 | <14 | 148 |
| | HDT-LV | <14 | 155 | <14 | 139 |
| G-Cure 106 | N 75 | <14 | 165 | <14 | 155 |
| | L 67 | 116 | 171 | 99 | 157 |
| | VL | 136 | 152 | 134 | 149 |
| | HDT | <14 | 181 | <14 | 177 |
| | HDT-LV | <14 | 175 | <14 | 175 |
| G-Cure 109 | N 75 | <14 | 175 | <14 | 167 |
| | L 67 | 106 | 168 | 91 | 168 |
| | VL | 118 | 143 | 146 | 167 |
| | HDT | <14 | 185 | <14 | 160 |
| | HDT-LV | <14 | 181 | <14 | 164 |

TABLE 4

Comparison of the Strengths of Finishing Lacquers (Polyester)

| Polyol/reactive diluent Isocyanate | D 650 N 75 | D 650/750 N 75 | 651 N 75 | 651/750 N 75 |
|---|---|---|---|---|
| Spraying viscosity 40–80 secs., % solv. | 34.0 | 27.0 | 27.3 | 21.2 |
| % Solids | 66.0 | 73.0 | 72.7 | 78.8 |
| Gloss | 53 | 88 | 86 | 86 |
| Whiteness after h QUV | | | | |
| Beginning | 86.0 | 87.5 | 85.8 | 84.9 |
| 500 h | 75.5 | 79.8 | 79.2 | 78.1 |
| Gloss after h QUV | | | | |
| Beginning | 56 | 92 | 90 | 90 |
| 500 h | 9 | 29 | 66 | 49 |
| MEK | >1 h | >1 h | >1 h | ~1 h |

TABLE 4-continued

Comparison of the Strengths of Finishing Lacquers (Polyester)

| Polyol/reactive diluent | 670 | 670/750 | 670 | 670/750 |
|---|---|---|---|---|
| Isocyanate | N 75 | N 75 | HDT-LV | HDT-LV |
| Spraying viscosity 40–80 secs., % solv. | 22.0 | 24.5 | 19.6 | 16.6 |
| % Solids | 78.0 | 75.5 | 80.4 | 83.4 |
| Gloss | — | — | — | — |
| Whiteness after h QUV | | | | |
| Beginning | 86.2 | 87.9 | 87.3 | 87.4 |
| 500 h | 76.5 | 76.6 | 77.4 | 78.7 |
| Gloss after h QUV | | | | |
| Beginning | n.m. | n.m. | n.m. | n.m. |
| 500 h | n.m. | n.m. | n.m. | n.m. |
| MEK | <1 Min. | <1 Min. | <1 Min. | <1 Min. |

TABLE 5

Comparison of the Strengths of Finishing Lacquers (Acrylates)

| Polyol | G 105/750 | G 105/750 | G 105 | G 105/750 |
|---|---|---|---|---|
| Isocyanate | N 75 | N 75 | HDT-LV | HDT-LV |
| % Solv. at spraying visc. | | | | |
| 50–100 secs. | 32.7 | 29.7 | 30.3 | 25.5 |
| % Solids | 67.3 | 70.3 | 69.7 | 74.5 |
| Whiteness after h QUV | | | | |
| Beginning | 89.7 | 85.1 | 87.9 | 83.9 |
| 500 h | 81.7 | 77.8 | 82.3 | 77.9 |
| MEK | ~1 min. | ~1 min. | ~1 min. | ~1 min. |
| Polyol | G 106 | G 106/750 | G 106 | G 106/750 |
| Isocyanate | N 75 | N 75 | HDT-LV | HDT-LV |
| % Solv. at spraying visc. | | | | |
| 50–100 secs. | 28.4 | 27.0 | 25.3 | 22.5 |
| % Solids | 71.6 | 73.0 | 74.7 | 77.5 |
| Whiteness after h QUV | | | | |
| Beginning | 89.2 | 85.9 | 88.4 | 85.8 |
| 500 h | 85.2 | 81.8 | 84.5 | 81.6 |
| MEK | ~5 mins. | ~1 min. | ~1 min. | ~min. |
| Polyol | G 109 | G 109/750 | G 109 | G 109/750 |
| Isocyanate | N 75 | N 75 | HDT-LV | HDT-LV |
| % Solv. at spraying visc. | | | | |
| 50–100 secs. | 28.0 | 27.8 | 24.9 | 23.7 |
| % Solids | 72.0 | 72.2 | 75.1 | 76.3 |
| Whiteness after h QUV | | | | |
| Beginning | 87.9 | 85.6 | 89.4 | 84.6 |
| 500 h | 81.7 | 80.8 | 82.2 | 80.9 |
| MEK | ~5 mins. | ~5 mins. | ~5 mins. | ~1 min. |

What is claimed is:

1. A process for producing coating compositions comprising: (a) providing a reactive diluent, (b) providing an inert solvent, (c) providing a polymeric polyol, (d) providing an isocyanate, (e) reacting (a)–(d) in a reactive diluent comprising a ring opening product of a carboxylic acid ester epoxide with a dihydric or higher alcohol.

2. The improved process of claim 1, wherein said carboxylic acid ester epoxide is selected from the group consisting of epoxide of fatty acid, epoxide of fatty acid ester and mixtures thereof.

3. The improved process of claim 1, wherein said carboxylic acid ester epoxide is selected from the group consisting of epoxide of fatty acid of natural origin, epoxide of fatty acid ester of natural origin and mixtures thereof.

4. The improved process of claim 1, wherein said carboxylic acid ester epoxide comprises a $C_{6-24}$ fatty acid residue.

5. The improved process of claim 1, wherein said polymeric polyol is selected from the group consisting of polyester polyol, polyether polyol, alkyd resin, hydroxyl-containing polyacrylate, hydroxyl-containing polymethacrylate and mixtures thereof.

6. The improved process of claim 1, wherein said inert solvent is present in a quantity of about 1 to about 99% by weight, based on the total solvent and reactive diluent content.

7. The improved process of claim 1, wherein said inert solvent is selected from the group consisting of xylene, toluene, methoxypropyl acetate, ethoxypropyl acetate, ethyl benzene, propyl benzene, 2-methoxy-1-methyl ethyl acetate and mixtures thereof.

8. A process for the production of polyurethane-based coating compositions, comprising the step of mixing:
   polyol;
   inert solvent;
   a ring opening product of combining carboxylic acid ester epoxide with dihydric or higher alcohol as a reactive diluent; and
   isocyanate.

9. Coating compositions comprising:
   a ring opening product of combining carboxylic acid ester epoxide with dihydric or higher alcohol as a reactive diluent;
   polymeric polyol;
   inert solvent; and
   isocyanate.

10. The composition of claim 9, wherein said carboxylic acid ester epoxide is selected from the group consisting of epoxide of fatty acid, epoxide of fatty acid ester and mixtures thereof.

11. The composition of claim 9, wherein said carboxylic acid ester epoxide is selected from the group consisting of epoxide of fatty acid of natural origin, epoxide of fatty acid ester of natural origin and mixtures thereof.

12. The composition of claim 9, wherein said carboxylic acid ester epoxide is selected from the group consisting of epoxide of beef tallow, epoxide of palm oil, epoxide of peanut oil, epoxide of castor oil, epoxide of rapeseed oil, epoxide of cottonseed oil, epoxide of soybean oil, epoxide of train oil, epoxide of sesame oil, epoxide of sunflower oil, epoxide of corn oil, epoxide of poppyseed oil, epoxide of perilla oil, epoxide of cereal seed oil, epoxide of linseed oil, epoxide of tall oil fatty acid ester and mixtures thereof.

13. The composition of claim 9, wherein said carboxylic acid ester epoxides comprise a $C_{6-24}$ fatty acid residue.

14. The composition of claim 9, wherein said higher alcohol is an aliphatic alcohol comprising about 2 to about 44 carbon atoms and has a functionality of about 1 to about 6.

15. The composition of claim 9, wherein said dihydric or higher alcohol is an aliphatic alcohol comprising about 2 to about 6 carbon atoms and has a functionality of about 2 to about 4.

16. The composition of claim 9, wherein said dihydric or higher alcohol is selected from the group consisting of ethylene glycol, propylene glycol, butylene glycol, glycerol, trimethylol propane and alkoxylation products thereof with ethylene oxide, propylene oxide and ethylene oxide/propylene oxide mixtures and mixtures thereof.

17. The composition of claim 9, wherein the ratio of the OH groups of said dihydric or higher alcohol to the oxirane rings of said carboxylic acid ester epoxide is between about 5:1 and about 1:5.

18. The composition of claim 9, wherein the ratio of the OH groups of said dihydric or higher alcohol to the oxirane rings of said carboxylic acid ester epoxide is between about 2:1 and about 1:2.

19. The composition of claim 9, wherein the ratio of the OH groups of said dihydric or higher alcohol to the oxirane rings of said carboxylic acid ester epoxide is between about 1.4:1 to about 1:1.4.

20. The composition of claim 9, wherein the reactive diluent has an OH value of about 30 to about 800.

21. The composition of claim 9, wherein the reactive diluent has an OH value of about 120 to about 550.

22. The compostion of claim 9, wherein the reactive diluent has an epoxide value of up to about 9.5.

23. The composition of claim 9, wherein the reactive diluent has an epoxide value of up to about 5.5.

24. The composition of claim 9, wherein the reactive diluent has an epoxide value of up to about 2.5.

* * * * *